No. 850,022. PATENTED APR. 9, 1907.
C. B. LEWIS.
PIE CUTTER.
APPLICATION FILED JAN. 29, 1906.
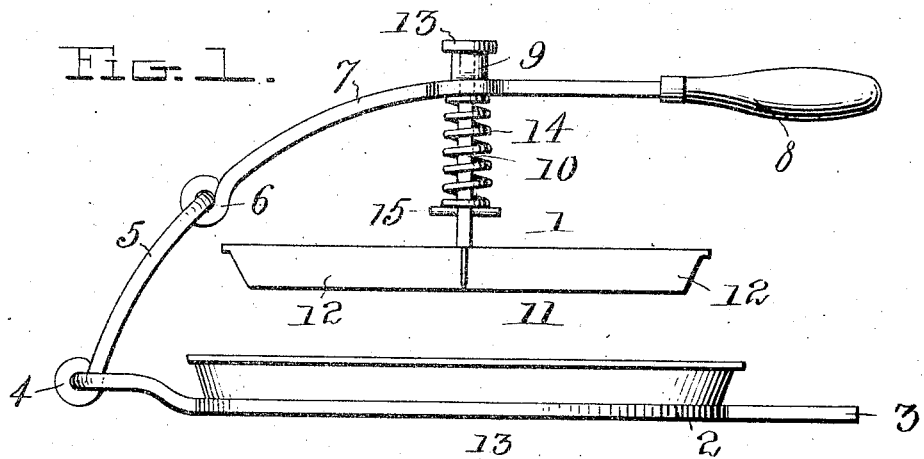
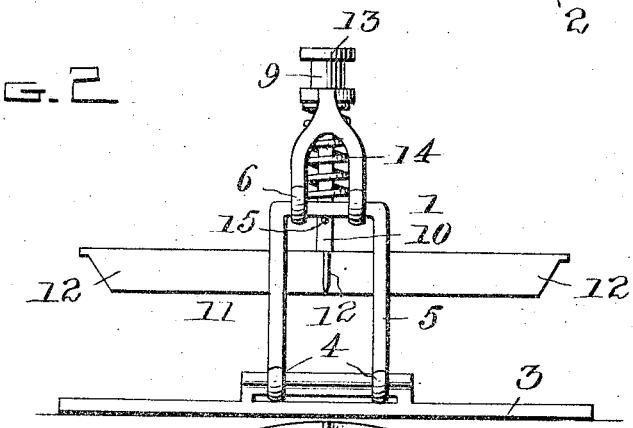
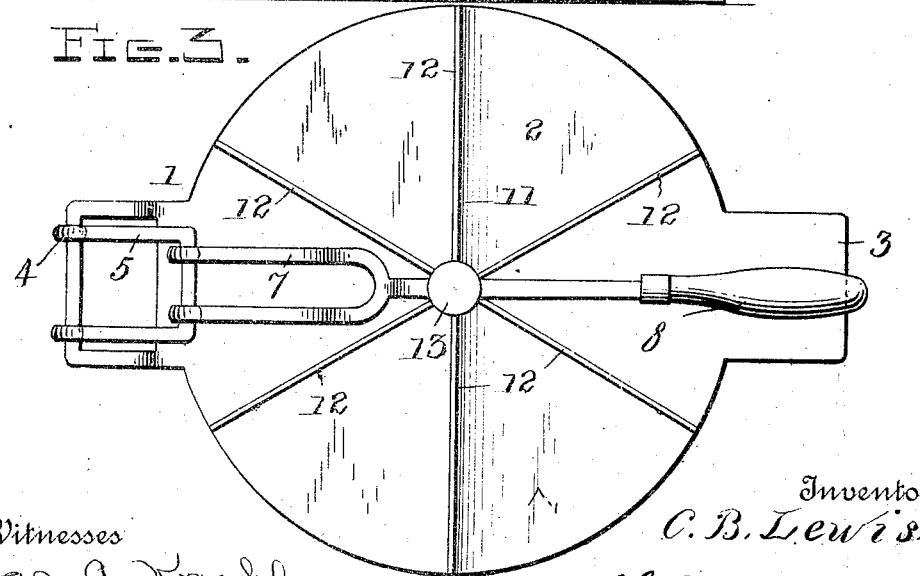
Witnesses
Jas. A. Koehl
C. H. Griesbauer
Inventor
C. B. Lewis
by H. B. Willson
Attorney

UNITED STATES PATENT OFFICE.

CLARENCE B. LEWIS, OF LOS ANGELES, CALIFORNIA.

PIE-CUTTER.

No. 850,022. Specification of Letters Patent. Patented April 9, 1907.

Application filed January 29, 1906. Serial No. 298,420.

*To all whom it may concern:*

Be it known that I, CLARENCE B. LEWIS, a citizen of the United States, residing at Los Angeles, in the county of Los Angeles and State of California, have invented certain new and useful Improvements in Pie-Cutters; and I do declare the following to be a full, clear, and exact description of the invention, such as will enable others skilled in the art to which it appertains to make and use the same.

My invention relates to improvements in devices for cutting pie and the like; and it consists in the novel construction, combination, and arrangement of parts hereinafter described and claimed.

The object of the invention is to provide a simple and comparatively inexpensive device of this character by means of which a pie, cake, or the like may be quickly cut into a number of pieces or slices of equal size.

The above and other objects, which will appear as the nature of the invention is better understood, are accomplished by means of the construction illustrated in the accompanying drawings, in which—

Figure 1 is a side elevation of my improved pie-cutter. Fig. 2 is a similar view taken at right angles to Fig. 1, and Fig. 3 is a top plan view of the same.

Referring to the drawings by numeral, 1 denotes my improved pie-cutter, which comprises a base-plate 2, preferably of circular form, having a handle 3 arranged at a suitable point. Upon said base-plate, at a point diametrically opposite the handle, is hingedly mounted, as at 4, a substantially U-shaped bracket or link 5, to the upper or free portion of which is hingedly connected, as shown at 6, an operating-lever 7. The latter has a handle 8 at one end, and its opposite or hinged end 6 is bifurcated, as clearly shown in Figs. 2 and 3 of the drawings. Slidably mounted in a guide 9, at a suitable point in said lever, is a rod 10, which carries at its lower end a cutter 11. This cutter preferably comprises a plurality of radially-arranged blades 12, which are connected to each other and to the lower end of the rod 10 at their inner ends. Any number of the blades 12 may be employed, and they may be of any size and shape; but I preferably employ six when the device is to be used for cutting pies and shape them, as shown, so that they will fit the pie pan or plate which rests upon the base-plate 2, as shown in the drawings. The sliding movement of the rod 10 in the guide 9 is limited by a stop 13, provided upon the upper end of said rod, and the latter is forced downwardly in the guide by a coiled spring 14, which surrounds the rod between the lower end of the guide or the lever 7 and a stop 15, arranged upon said rod. It will be seen that by yieldingly connecting the cutter to the lever in this manner and connecting the lever to the base-plate by the double-hinge connection, as shown and described, the cutter may be quickly centered upon a pie or the like placed upon the base 2, and the cutter may be moved downwardly in a vertical or perpendicular plane.

From the foregoing description, taken in connection with the accompanying drawings, the construction, operation, and advantages of the invention will be readily understood without requiring a more extended explanation.

Various changes in the form, proportion, and the minor details of construction may be resorted to without departing from the principle or sacrificing any of the advantages of the invention as defined by the appended claims.

Having thus described my invention, what I claim as new, and desire to secure by Letters Patent, is—

A pie-cutter comprising a base, a substantially U-shaped hinge-link having its ends hingedly connected to said base, a lever hingedly connected to said U-shaped hinge-link, a guide upon said lever, a rod slidable in said guide, a stop upon the upper end of said rod, a stop upon the lower portion of said rod, a coiled spring surrounding said rod between said guide and the last-mentioned stop, and a cutter upon the lower end of said rod consisting of a plurality of radially-arranged blades, substantially as shown and described.

In testimony whereof I have hereunto set my hand in presence of two subscribing witnesses.

CLARENCE B. LEWIS.

Witnesses:
J. D. GORDON,
E. J. DE LANEY.